Jan. 22, 1963　　　　　F. E. HANSCOM　　　　　3,074,338
CAMERA SUPPORTS
Filed May 14, 1959　　　　　　　　　　　　　　2 Sheets-Sheet 1
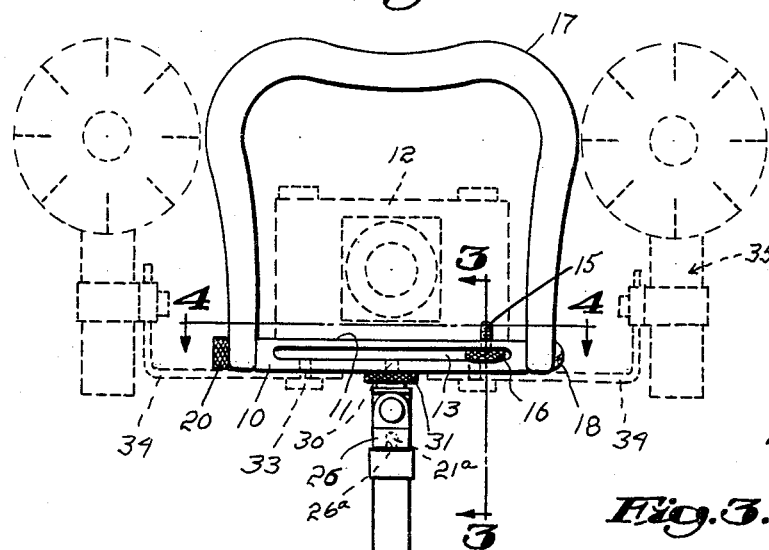
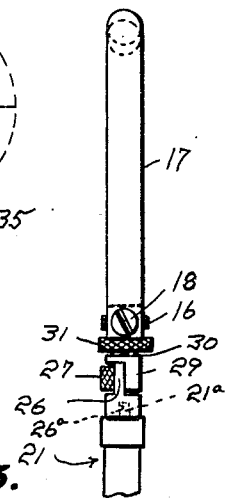
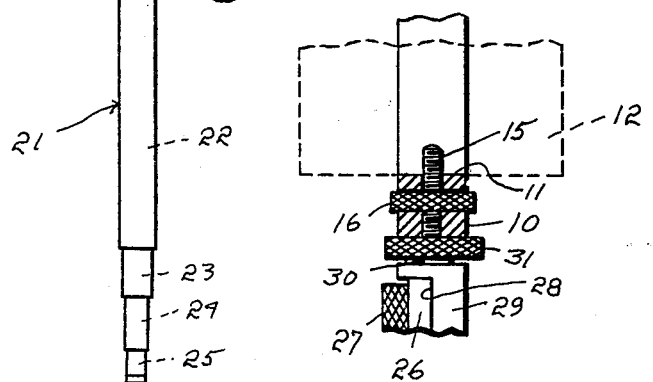
Inventor:
Frank E. Hanscom,
by
Attorney

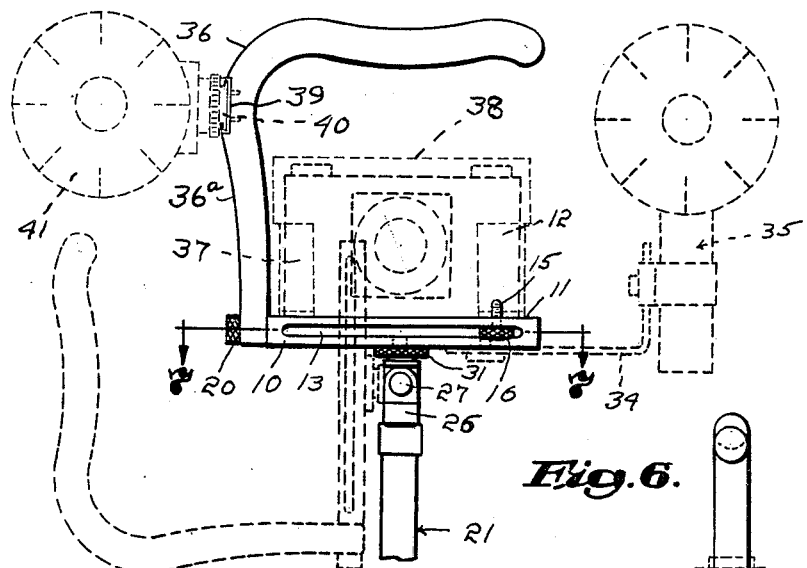
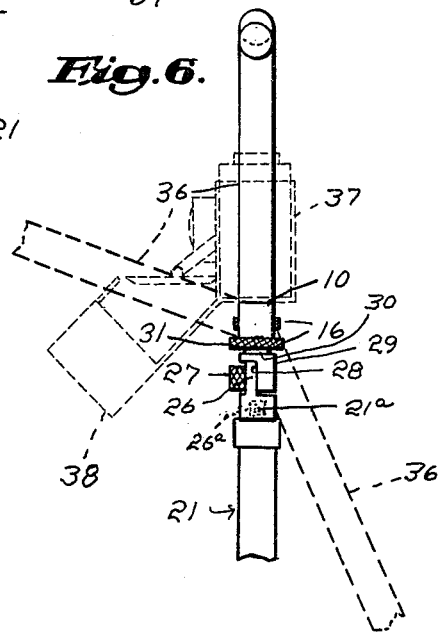
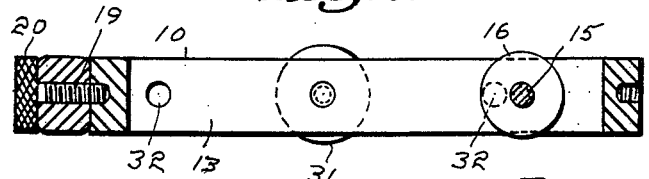

3,074,338
CAMERA SUPPORTS
Frank E. Hanscom, 21 Simmons Road,
South Portland, Maine
Filed May 14, 1959, Ser. No. 813,166
12 Claims. (Cl. 95—86)

The present invention relates to a camera support in the form of a cane to which a camera may be detachably secured and which affords maximum ease and convenience both in carrying and in using such photographic equipment.

There are a large number of camera enthusiasts who want to have their cameras with them whenever possible. While the invention may be used with other cameras, particular reference is made to those using 35 mm. film as the most popular type that can be easily carried, usually by a neck encircling strap. Often cameras are carried with accessories in a bag but, when pictures are to be taken, usually the accessories are not carried because of the inconvenience in so doing even though better results might be attained if they were used. Under favorable light conditions, good pictures can be taken with a camera that is manually held, but it is usually regarded as necessary to rely on a tripod or other firm support whenever the time of an exposure is in the order of 1/25 second or more but such supports are the most objectionable accessory to carry.

The principal objectives of the present invention are to provide a support, in the general form of a cane, having a mount to which a camera may be detachably secured and a handle which extends over the top of the camera in spaced relation thereto and which is pivoted to the mount with its axis lengthwise thereof and adapted to be swung into and securely locked in any desired position relative thereto.

In the accompanying drawings, there are shown illustrative embodiments of the invention from which its objectives, novel features, and advantages will be readily apparent. In the drawings, FIG. 1 is a front elevation of a camera support in accordance with the invention;

FIG. 2 is a side view thereof;

FIGS. 3 and 4 are sections taken, respectively, along the indicated lines 3—3 and 4—4 of FIG. 1;

FIG. 5 is a view, similar to FIG. 1, illustrative of a modification of the invention and with the camera provided with a case;

FIG. 6 is a side view thereof showing the case opened, and

FIG. 7 is a section taken approximately along the indicated lines 7—7 of FIG. 5.

In accordance with the embodiments of the invention shown in the drawings, a camera support includes a mount 10 having a flat supporting surface 11 for a camera 12 and a longitudinal slot 13 extending transversely through the holder 10. A longitudinal slot 14 extends from the slot 13 transversely through the holder 10. A longitudinal slot 14 extends from the slot 13 upwardly through the supporting surface 11 to slidably confine an upwardly disposed screw 15 having a knurled head 16 confined in the slot 13 and so dimensioned that portions so protrude from both sides of the mount 10 that it can be digitally engaged and turned to feed its screw 15 into or out of a socket with which the undersurface of cameras such as the camera 12 are customarily provided thus to lock the camera 12 to the mount 10 or to release it therefrom.

A handle 17, shown as being approximately U-shaped, has one of its ends pivotally attached to one end of the mount 10 as by a screw 18 while the other end of the handle 17 is connected to the opposite end of the mount 10 by a screw 19 provided with a knurled head 20 to facilitate the clamping of the handle 17 in a wanted position of use or its release so that it may be swung into and then locked in another position of use.

The handle 17, see FIGS. 1 and 2, is shown as overlying the top of the camera 12 and spaced therefrom to serve as a carrying handle. The pivot axis of the handle 17 as defined by the screws 18 and 19 extends lengthwise of the mount 10 so that the handle 17 could be swung entirely about it were it not for supporting structure, generally indicated at 21, and shown as a unipod including a main section 22, and telescoping sections 22, 23, and 24. It will be obvious that the supporting structure could be a tripod but the use of a unipod is preferred.

The mount 10 is provided with a shouldered connector 26 through which extends a transverse pivot 27 threaded into a seat 28 in the head 29 of a screw 30 threaded into the undersurface of the mount 10 and provided with a knurled nut 31. The connector 26 has a threaded bore 26a to receive the threaded attaching member 21a of the supporting structure 21. The connector 26 enables the mount 10 to be pivoted relative to the supporting structure. In practise, the undersurface of the mount 10 also has a pair of spaced holes 32 threaded to receive screws 33 for clamping the bracket 34 of a flash unit 35 thereto.

In the embodiment of the invention illustrated by FIGS. 5–7, a handle 36 overlies the top of the camera 12 in spaced relation thereto but is L-shaped and locked to the mount 10 only by the screw 19. FIG. 5 illustrates the tilting of the handle 36 and mount 10 as a unit relative to the supporting structure 21 and FIG. 6 illustrates that the swinging of the handle 36, relative to the mount 10 is limited only by the supporting structure and it will be apparent that the handle 17 has a similarly wide range of positions of use relative to the mount 10.

While a camera support in accordance with the invention may have a special case, one of its advantages is that it enables the cases of most cameras to be used. By way of example, the case 37 is illustrative of one conventional type and its closure 38 is adapted to be opened and closed without interference from the mount 10 or its handle.

While both illustrated embodiments of the invention show a flash unit 35 attached to their mounts by brackets, a flash unit may be attached to the handles. As shown in FIG. 5, the handle 36 is provided with a shoe 39 exposed on the outer edge of its upright 36a. The shoe 39 slidably receives a foot 40 with which the flash unit 41 is provided. This arrangement is advantageous in that the handle can be tilted so that, for example, all or a part of the light may be bounced against the ceiling.

It will thus be apparent that a camera support in accordance with the invention is well adapted to meet the requirements of photographers since it provides an easy way for maintaining equipment ready for use, ensures better pictures by means of an ever ready adjustable support, and enables the photographer to have a cane which is often of utility in reaching or returning from areas where pictures are to be taken.

What I therefore claim and desire to secure by Letters Patent is:

1. A camera support comprising a mount, means carried by said mount for attaching a camera thereto, said mount extending under said camera in a direction side-to-side thereof, a handle, lockable pivot means locking said handle to said mount with its pivot axis extending lengthwise thereof and being adjustable to permit said handle to be swung about said mount in a fore and aft direction, and supporting structure attached to said mount.

2. A camera support comprising a mount, means carried by said mount for attaching a camera thereto, said mount extending under said camera in a direction side-to-side thereof, a handle, lockable pivot means locking said handle to said mount with its pivot axis extending lengthwise thereof and being adjustable to permit said handle to be swung about said mount in a fore and aft direction, supporting structure, and pivot means disposed transversely with respect to said mount and attaching said structure thereto, said camera attaching means and said last mentioned pivot means being located relative to each other to position the center of the lens axis in a plane inclusive of the axis of said last mentioned pivot means.

3. A camera support comprising a mount, means carried by said mount for attaching a camera to the upper surface thereof, said mount extending under said camera in a direction side-to-side thereof, a handle, lockable pivot means locking said handle to said mount in a position spaced from but extending at least part way across the top of the attached camera and with the pivot axis extending lengthwise of the mount, said pivot means being adjustable to permit said handle to be swung in a fore and aft direction relative to said camera about said mount, and supporting structure attached to said mount.

4. A camera support comprising a mount, means carried by said mount for attaching a camera centrally with respect to the upper surface thereof, a handle, lockable pivot means locking said handle to said mount in a position spaced from but extending approximately across the top of the attached camera and with the pivot axis extending lengthwise of the mount, said pivot means being adjustable to permit said handle to be swung about said mount, and supporting structure attached to the center of said mount.

5. A camera support comprising a mount, means carried by said mount for attaching a camera to the upper surface thereof, a handle, lockable pivot means locking said handle to both ends of said mount, said handle being shaped and dimensioned to extend across the top of the attached camera in spaced relation thereto and with the pivot axis extending lengthwise of the mount, said pivot means being adjustable to permit said handle to be swung about said mount, and supporting structure attached to said mount.

6. In a camera support, a mount having a camera supporting surface, a first longitudinal slot extending transversely through said mount, a second longitudinal slot extending through said surface into communication with said transverse slot, a camera anchoring screw extending through said second slot and including a head confined in said first slot and dimensioned to protrude therefrom, and a handle pivotally connected to at least one end of said mount and being shaped and dimensioned to overlie the top of the camera in spaced relation thereto.

7. A camera support for use with supporting structure, said support comprising a mount, means carried by said mount for use in attaching a camera thereto, a handle pivotally attached to at least one end of said mount and being shaped and disposed to overlie said camera in a direction lengthwise thereof, and means also carried by said mount for use in attaching said structure thereto.

8. A camera support for use with supporting structure, said support comprising a mount, means carried by said mount for use in attaching a camera thereto and being slidable lengthwise relative to said mount, said mount extending under said camera in a direction side-to-side thereof, a handle pivotally attached to at least one end of said mount and being shaped and disposed to overlie said camera, and means also carried by said mount for use in attaching said structure thereto.

9. A camera support comprising a mount, means carried by said mount for use in attaching a camera thereto, a handle, pivot means locking said handle to said mount with its pivot axis extending lengthwise thereof, said handle being shaped and disposed to establish an upright part and a part to overlie a camera attached to said mount, and flash light attaching means carried by said upright part.

10. A camera support comprising a mount, means carried by said mount for use in attaching a camera thereto with said mount extending under said camera in a direction side-to-side thereof, and a handle pivotally attached to at least one end of said mount and being shaped and disposed to overlie said camera.

11. A camera support for use with supporting structure, said support comprising a mount, means carried by said mount for use in attaching a camera thereto, a handle pivotally attached to at least one end of said mount and being shaped and disposed to overlie said camera, and means for use in attaching said structure thereto, said means including a pivotal connection with said mount having its axis at right angles to the pivot axis of the handle but in a plane parallel thereto.

12. A camera support comprising a mount, means carried by said mount for use in attaching a camera thereto, a handle, lockable pivot means locking said handle to said mount with its pivot axis extending lengthwise thereof, said handle being shaped and disposed to establish an upright part and a part to overlie a camera attached to said mount, and flashlight attaching means carried by said handle.

References Cited in the file of this patent

UNITED STATES PATENTS

| | | |
|---|---|---|
| 1,053,400 | Johnson | Feb. 18, 1913 |
| 2,614,471 | Markowitz | Oct. 21, 1952 |

FOREIGN PATENTS

| | | |
|---|---|---|
| 687,588 | Great Britain | Feb. 18, 1953 |